Figure 1:
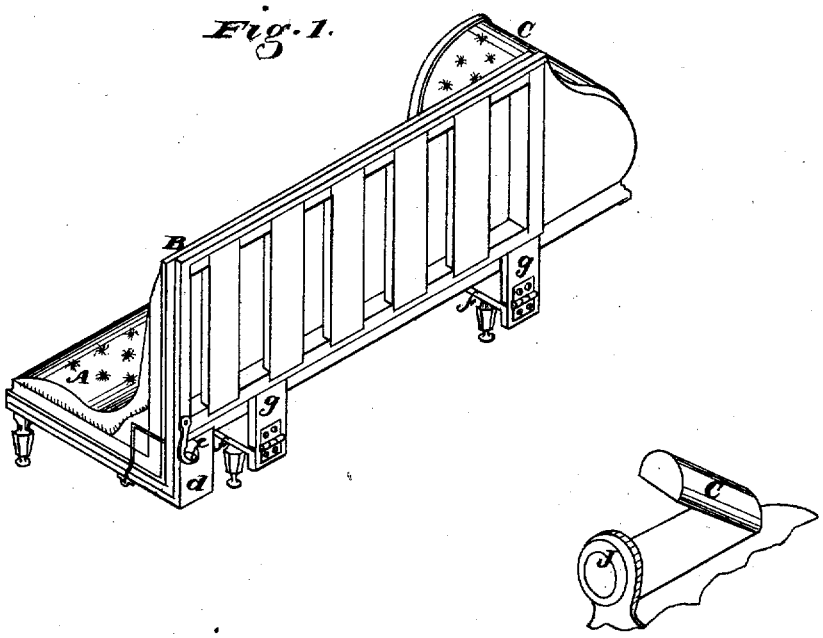
Figure 2:
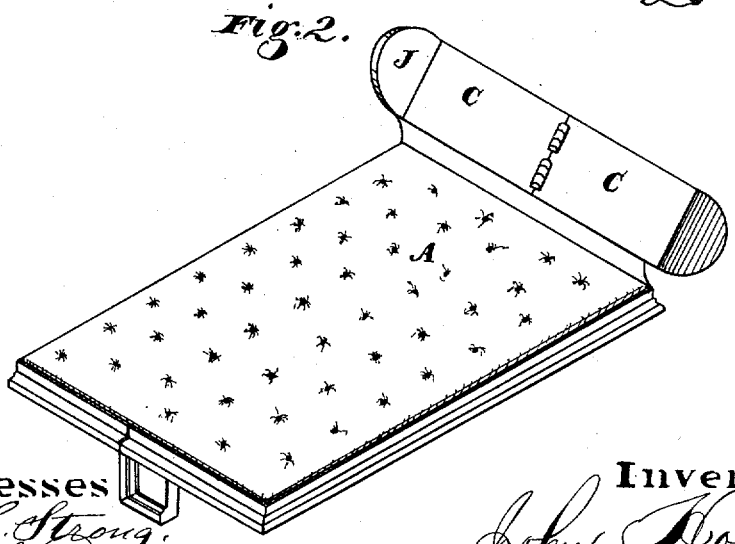

J. HOEY.

BED-LOUNGE.

No. 7,140. Reissued May 30, 1876.

Witnesses
Geo. H. Strong.
Jno L. Boone

Inventor
John Hoey
by Dewey & Co
Attys.

N. PETERS, PHOTO-LITHOGRAPHER, WASHINGTON, D. C.

UNITED STATES PATENT OFFICE.

JOHN HOEY, OF SAN FRANCISCO, CALIFORNIA.

IMPROVEMENT IN BED-LOUNGES.

Specification forming part of Letters Patent No. 156,252, dated October 27, 1874; reissue No. 7,140, dated May 30, 1876; application filed September 24, 1875.

*To all whom it may concern:*

Be it known that I, JOHN HOEY, of San Francisco city and county, State of California, have invented an Improvement in Bed-Lounges; and I do hereby declare the following description and accompanying drawings are sufficient to enable any person skilled in the art or science to which it most nearly appertains to make and use my said invention or improvement without further invention or experiment.

My invention relates to improvements in that class of lounges in which the back of the lounge is hinged to the seat, so that it can be turned back, when it is desired to convert the lounge into a bed, until its upper or upholstered surface is on a level with the seat.

Referring to the accompanying drawing, A is the seat, B the back, and C the cylindrical arm, of a lounge. The back B is hinged to the rear edge of the seat, so that it can be let fall backward until its unholstered surface is level with the seat. It is evident that when the seat and back are thus hinged together, a triangular notch will be left at the foot of the lounge when the back stands upright. To fill this notch and support the back when it stands upright, I secure the corner of a block, *d*, by means of a hinge, to the bottom of the seat, so that it can be turned up into the notch, and be secured by a hook, *e*, or equivalent fastening, to the back at the diagonal corner, thus filling out the corner and completing the angle. By ornamenting this block to correspond with the molding or frames of the seat and back, its presence will scarcely be noticed.

In order to secure the back B more securely in its upright position, I extend one of the supporting-slats *f* of the bottom A out below the lower edge of the back, near each end of the lounge, and hinge a block, *g*, to its end, so that the blocks can be turned up against the lower edge of the back when it stands upright, and serve as a brace or leg to keep it in place. When the back is to be let down, these blocks, and also the corner-blocks *d*, are turned down under the lounge out of the way, and when the back B has assumed a horizontal position, its inner edge will rest upon the extended ends of the slats *f*, while the outside edge will be supported by folding legs. (Not shown.) The cylindrical arm or pillow C consists of two semi-cylinders, the rear edges of their plane sides being hinged together, so that when the two parts are folded together they will form a cylinder. When the back of the lounge is let down, so as to form a bed, the upper half of this cylinder is folded back, so as to lie across the end of the lowered or horizontal back, thus providing a pillow, and as the line of division of the cylinder is at an angle to the plane of the bed, each half will have the proper inclination for a pillow. In front of the closed cylinder I secure an upright circular plate, J, which fits against the end of the cylinder or pillow when it is closed. This plate is made in one solid piece, and fixed in place so that the end of the upper half of cylindrical arm or cushion will fold down close against it. This plate is ornamented on its front, so as to give the arm a neat appearance.

I am aware that a cylindrical arm or pillow and ornamental face-plate have been used heretofore, but the face-plate was hinged to the frame of the lounge, so as to be turned down out of the way, and the cushion folded over to the front; but the face-plate J in my lounge is stationary, while the upper portion of the cushion or arm folds backward upon the lowered back, and, inclosing this portion of the arm or cushion, its end fits down inside of the plate J.

Having thus described my invention, what I claim, and desire to secure by Letters Patent, is—

1. In combination with a lounge, having the back B arranged to turn down into a horizontal position, the hinged block *d* and hook *e*, substantially as and for the purpose above described.

2. In combination with a lounge, having the back B arranged to turn down into a horizontal position, the stationary face-plate J, in combination with the divided cushion C, which is arranged to turn backward, substantially as and for the purpose described.

JOHN HOEY.

Witnesses:
JNO. L. BOONE,
C. M. RICHARDSON.